United States Patent
Laine et al.

(10) Patent No.: US 12,337,813 B2
(45) Date of Patent: Jun. 24, 2025

(54) VEHICLE MOTION MANAGEMENT WITH A REDUNDANT WHEEL CONTROL SAFETY NET FUNCTION

(71) Applicant: Volvo Truck Corporation, Gothenburg (SE)

(72) Inventors: Leo Laine, Härryda (SE); Leon Henderson, Härryda (SE); Johan Lindberg, Gothenburg (SE); Adithya Arikere, Gothenburg (SE); Sidhant Ray, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 107 days.

(21) Appl. No.: 17/462,280

(22) Filed: Aug. 31, 2021

(65) Prior Publication Data
US 2022/0063575 A1    Mar. 3, 2022

(30) Foreign Application Priority Data

Sep. 1, 2020 (EP) .................................. 20193854

(51) Int. Cl.
*B60T 8/1761* (2006.01)
*B60T 8/17* (2006.01)
(Continued)

(52) U.S. Cl.
CPC .......... *B60T 8/1761* (2013.01); *B60T 8/1708* (2013.01); *B60T 8/171* (2013.01); *B60T 8/172* (2013.01);
(Continued)

(58) Field of Classification Search
CPC ...... B60T 8/1761; B60T 8/1708; B60T 8/171; B60T 8/172; B60T 8/58; B60T 2250/03; B60T 2270/413
See application file for complete search history.

(56) References Cited

U.S. PATENT DOCUMENTS 6,378,960 B1    4/2002  Demmeler
2013/0030601 A1*  1/2013  Yoon ..................... B60W 10/08
                                                        701/1
(Continued)

FOREIGN PATENT DOCUMENTS

AU    2014203462 A1    1/2016
DE    10033347 A1      1/2002
(Continued)

OTHER PUBLICATIONS

Extended European Search Report for European Patent Application No. 20193854.5, mailed Jan. 27, 2021, 8 pages.
(Continued)

*Primary Examiner* — Andrew J Cromer
(74) *Attorney, Agent, or Firm* — Withrow & Terranova, PLLC (57) ABSTRACT

A motion support device, MSD, control unit for a heavy duty vehicle, configured to control one or more MSDs associated with a wheel on the vehicle, wherein the MSD control unit is configured to be communicatively coupled to a vehicle motion management, VMM, unit for receiving control commands from the VMM unit comprising wheel speed and/or wheel slip requests to control vehicle motion by the one or more MSDs. The MSD control unit is configured to obtain a capability range indicating a range of wheel behaviors of the wheel for which the VMM unit is allowed to influence the behavior of the wheel by the control commands, monitor wheel behavior and to detect if wheel behavior is outside of the capability range, and trigger a control intervention function in case the monitored wheel behavior is outside of the capability range.

18 Claims, 5 Drawing Sheets

(51) Int. Cl.
*B60T 8/171* (2006.01)
*B60T 8/172* (2006.01)
*B60T 8/58* (2006.01)

(52) U.S. Cl.
CPC ............ *B60T 8/58* (2013.01); *B60T 2250/03* (2013.01); *B60T 2270/413* (2013.01)

(56) References Cited

U.S. PATENT DOCUMENTS

| | | | |
|---|---|---|---|
| 2015/0175009 A1* | 6/2015 | Beever | B60K 7/0007 |
| | | | 701/22 |
| 2017/0174192 A1 | 6/2017 | Ying | |
| 2019/0176784 A1* | 6/2019 | Laine | B60T 8/172 |
| 2019/0322256 A1* | 10/2019 | Tha | B60T 8/176 |
| 2020/0102008 A1 | 4/2020 | Pasquet | |

FOREIGN PATENT DOCUMENTS

| | | |
|---|---|---|
| DE | 102008017478 A1 | 10/2008 |
| EP | 0832800 A2 | 4/1998 |
| EP | 0832800 A3 | 9/2000 |
| WO | 2019072379 A1 | 4/2019 |

OTHER PUBLICATIONS

Examination Report for European Patent Application No. 20193854.5, mailed Jul. 6, 2023, 4 pages.

* cited by examiner

VEHICLE MOTION MANAGEMENT WITH A REDUNDANT WHEEL CONTROL SAFETY NET FUNCTION

RELATED APPLICATIONS

The present application claims priority to European Patent Application No. 20193854.5, filed on Sep. 1, 2020, and entitled "VEHICLE MOTION MANAGEMENT WITH A REDUNDANT WHEEL CONTROL SAFETY NET FUNCTION," which is incorporated herein by reference in its entirety.

TECHNICAL FIELD

The present disclosure relates to vehicle motion management for heavy duty vehicles, i.e., coordinated control of motion support devices such as service brakes and propulsion devices.

The invention can be applied in heavy-duty vehicles such as trucks, busses and construction machines. Although the invention will be described mainly with respect to cargo transport vehicles such as semi-trailer vehicles and trucks, the invention is not restricted to this particular type of vehicle but may also be used in other types of vehicles such as cars.

BACKGROUND

Vehicles are becoming ever more complex in terms of mechanics, pneumatics, hydraulics, electronics, and software. A modern heavy duty vehicle, such as a semi-trailer truck, may comprise a wide range of different physical devices, such as combustion engines, electric machines, friction brakes, regenerative brakes, shock absorbers, air bellows, and power steering pumps. These physical devices are commonly known as Motion Support Devices (MSD). The MSDs may be individually controllable, for instance, such that friction brakes may be applied at one wheel, i.e., a negative torque, while another wheel on the vehicle, perhaps even on the same wheel axle, is simultaneously used to generate a positive torque by means of an electric machine.

Recently proposed vehicle motion management (VMM) functionality executed, e.g., on a central vehicle unit computer (VUC), relies on combinations of the MSDs to operate the vehicle in order to obtain a desired motion effect while at the same time maintaining vehicle stability, cost efficiency, and safety. WO2019072379 A1 discloses one such example where wheel brakes are used selectively to assist a turning operation by a heavy duty vehicle. The VMM control may advantageously be based on wheel speed requests or wheel slip requests transmitted from the VMM to MSD control units which control the various MSDs by low delay-high bandwidth control loops targeted at maintaining wheel behavior as close as possible to the requested wheel slip or wheel speed values.

At least partly due to the complexity inherent in these advanced wheel speed- or wheel slip-based motion management functions, verification of overall system function against legacy safety standards may represent a challenge. There is a need for methods and control architectures which can prevent these advanced motion management functions from inadvertently locking wheels and/or introducing an undesired yaw motion by the vehicle.

SUMMARY

It is an object of the present disclosure to provide improved vehicle control units, methods, and functions which meet safety requirements placed on heavy duty vehicles. This object is at least in part obtained by a motion support device (MSD) control unit for a heavy duty vehicle. The MSD control unit is configured to control one or more MSDs associated with at least one wheel on the vehicle, i.e., the control units disclosed herein may be configured to control a single wheel on the vehicle, or both wheels on an axle of a vehicle, or all the wheels on some part of a vehicle. The MSD control unit is configured to be communicatively coupled to a vehicle motion management (VMM) unit for receiving control commands from the VMM unit comprising wheel speed and/or wheel slip requests to control vehicle motion by the one or more MSDs. The MSD control unit is configured to obtain a capability range indicating a range of wheel behaviors of the wheel for which the VMM unit is allowed to influence the behavior of the wheel by the control commands. The MSD control unit is also configured to monitor wheel behavior and to detect if wheel behavior is outside of the capability range, where the MSD control unit is configured to trigger a control intervention function in case the monitored wheel behavior is outside of the capability range.

This means that the VMM is allowed to control the at least one wheel freely as long as the resulting wheel behavior is within the capability range. However, as soon as wheel behavior deviates from the capability range, the control intervention function is triggered by the MSD control unit. Thus, legacy safety standards are still met because of this safety net which is implemented via the capability range and control intervention function. This way, more advanced functionality can be introduced in the vehicle without having to undergo the extensive testing and verification which had been necessary if the legacy safety mechanisms had not been left intact. With some small modifications to existing communication signals and special considerations in VMM relating to the allocation of wheel speed requests, legacy anti-lock braking functions, as well as traction control and stability control functionality that exists in the brake systems of today can be re-used to provide this safety net.

For instance, the one or more MSDs may comprise at least one service brake configured to generate negative torque by the wheel, and at least one propulsion unit configured to generate a positive and/or a negative torque by the wheel. Thus, the proposed control units are suitable for controlling and coordinating both propulsion devices and wheel brakes, which is advantageous.

According to some aspects, the capability range comprises an upper limit and/or a lower limit on allowable positive and/or negative longitudinal wheel slip and/or wheel rotational speed. This means that the safety net function steps in if the VMM control results in a wheel behavior with a wheel slip beyond an acceptable value. This acceptable value may, e.g., correspond to a wheel slip value where an approximately linear relationship between tire force and wheel slip is obtained. The capability range may also comprise an upper limit and/or a lower limit on allowable positive and/or negative longitudinal wheel acceleration, as well as an upper limit and/or a lower limit on allowable positive and/or negative vehicle yaw rate. Thus, the vehicle control units discussed herein define a capability range based on any of wheel slip, wheel speed, wheel acceleration, and/or yaw rate. As long as wheel behavior remains within the boundaries set by the capability range, VMM is allowed to control wheel behavior. However, if the wheel behavior deviates from the currently set capability range, then counter-measures are taken to ensure safe vehicle handling.

According to some aspects, the MSD control unit is configured to receive wheel speed data associated with the wheel from a wheel speed sensor and to detect if wheel behavior is outside of the capability range based on the wheel speed data. In a way, wheel speed, wheel acceleration, and wheel slip are all measures of the same wheel behavior and can be used interchangeably.

According to some aspects, the MSD control unit is configured to obtain a fixed capability range as a parameter loaded from memory or received from an external configuration entity. This fixed capability range can be programmed independently, of, e.g., a legacy vehicle safety standard or safety verification test. However, the MSD control unit may also be configured to continuously obtain an updated capability range. This updated capability range can be dynamically configured independently of, e.g., vehicle type, vehicle transport mission, or other parameters such as driving conditions or the like. For instance, driving conditions and/or transport missions can be such as to warrant an increased safety margin.

According to some aspects, the control intervention function comprises executing an intervention function by one or more of the MSDs. Such intervention functions may, e.g., comprise an anti-lock function, traction control functions, and the like.

According to some aspects, the control intervention function comprises triggering a request to an external arbitrator function for direct MSD control by the MSD control unit. This allows for arbitration between conflicting requests. For instance, it may be the case that the consequences of not allowing VMM control in some scenarios are worse than allowing the VMM to complete execution of, e.g., an ongoing emergency maneuver.

According to some aspects, the MSD control unit is configured to monitor wheel behavior by filtering samples of wheel behavior over time and to detect if wheel behavior is outside of the capability range based on the result of the filtering. This allows for suppressing spurious deviations from the capability range, which deviations may be caused by measurement error and/or by transient effects which do not warrant triggering an intervention function.

The object is also obtained by a vehicle motion management (VMM) unit configured to perform vehicle motion management for controlling motion of a heavy duty vehicle by one or more motion support devices (MSDs) associated with at least one wheel on the vehicle.

The VMM unit is configured to be communicatively coupled to an MSD control unit for transmitting control commands comprising wheel speed and/or wheel slip requests to the MSD control unit to control vehicle motion by the one or more MSDs, wherein the VMM unit is configured to obtain a capability range indicating a range of wheel behaviors of the wheel for which the VMM unit is allowed to influence the behavior of the wheel by the control commands, and wherein the VMM unit is configured to generate the control commands such that the wheel behavior is within the capability range.

Thus, as discussed above, the VMM unit is allowed to more freely control the wheel or wheels as long as the resulting behavior stays within the obtained capability range. The VMM unit is configured to control the vehicle without generating a control command which results in wheel behavior which deviates from the capability range. Thus, the capability range indirectly influences vehicle control, such as force distribution and trajectory planning.

For instance, a stricter limit on wheel slip may influence vehicle motion management such that a less aggressive trajectory is chosen. On the other hand, a more relaxed capability range may allow for a more aggressive vehicle motion management control associated with higher wheel slip and/or higher yaw rate.

According to aspects, the VMM unit comprises an arbitrator function configured to receive a request for direct MSD control by the MSD control unit and to cede vehicle control to the MSD control unit in case wheel behavior is outside of a pre-determined wheel behavior safety range. This arbitrator function may be configured to arbitrate between a desired VMM control target and allowing the MSD control unit to intervene. This way an occasional deviation in wheel behavior can be tolerated in some cases where it is deemed worse to cede control to the MSD control unit. This may, for instance, be the case if an emergency avoidance maneuver is being executed to avoid an obstacle, in which case a slightly higher wheel slip may temporarily be allowed.

There is also disclosed herein computer programs, computer readable media, computer program products, and vehicles associated with the above discussed advantages.

Generally, all terms used in the claims are to be interpreted according to their ordinary meaning in the technical field unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed unless explicitly stated. Further features of, and advantages of, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

Figure 1:
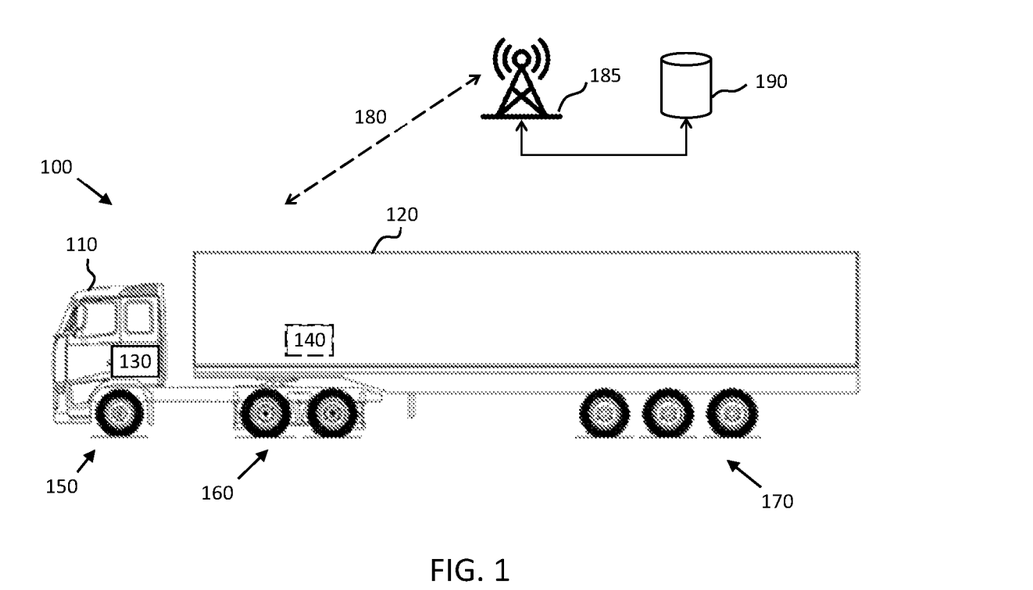
FIG. 1 shows an example heavy duty vehicle.

FIG. 1 illustrates an example vehicle 100 for cargo transport where the herein disclosed techniques can be applied with advantage. The vehicle 100 comprises a tractor or towing vehicle 110 supported on front wheels 150 and rear wheels 160, at least some of which are driven wheels. The tractor 110 is configured to tow a first trailer unit 120 supported on trailer wheels 170 by a fifth wheel connection in a known manner. The trailer wheels are normally braked wheels but may also comprise driven wheels on one or more axles.

The tractor 110 comprises a vehicle unit computer (VUC) 130 for controlling various kinds of functionality, for example, to achieve propulsion, braking, and steering. Some trailer units 120 also comprise a VUC 140 for controlling various functions of the trailer, such as braking of trailer wheels and sometimes also trailer wheel propulsion. The VUCs 130, 140 may be centralized or distributed over several processing circuits. Parts of the vehicle control functions may also be executed remotely, e.g., on a remote server 190 connected to the vehicle 100 via wireless link 180 and a wireless access network 185.

The VUC 130 on the tractor 110 (and possibly also the VUC 140 on the trailer 120) may be configured to execute vehicle control methods which are organized according to a layered functional architecture where some functionality may be comprised in a traffic situation management (TSM) domain in a higher layer, and some other functionality may be comprised in a vehicle motion management (VMM) domain residing in a lower functional layer. The TSM plans driving operation with a time horizon of, e.g., 10 seconds. This time frame corresponds to, e.g., the time it takes for the vehicle 100 to negotiate a curve. The vehicle maneuvers planned and executed by the TSM can be associated with acceleration profiles and curvature profiles. The TSM continuously requests the desired acceleration profiles and curvature profiles from the VMM function, which performs force allocation to meet the requests from the TSM in a safe and robust manner.

The VMM operates with a time horizon of about 1 second or so and continuously transforms the acceleration profiles and curvature profiles into control commands for controlling vehicle motion functions, actuated by the different MSDs of the vehicle. If the vehicle is in motion, the VMM performs motion estimation, i.e., determines positions, speeds, accelerations, articulation angles of the different units in the vehicle combination by monitoring operations using various sensors configured on the vehicle, often in connection to the MSDs. For instance, by determining vehicle unit motion using, e.g., global positioning systems, radar sensors, and/or lidar sensors, and translating this vehicle unit motion into a local coordinate system of a given wheel, it becomes possible to accurately estimate wheel slip by comparing the vehicle unit motion in the wheel reference coordinate system to data obtained from a wheel speed sensor configured in connection to the wheel. A tire model, which will be discussed in more detail in connection to FIG. 3, can be used to translate between desired tire force and wheel slip.

The VMM furthermore manages force generation and coordination, i.e., it determines what forces are required in order to fulfill the requests from the TSM, for instance, to accelerate the vehicle according to a requested acceleration profile requested by TSM and/or to generate a certain curvature motion by the vehicle also requested by TSM. The forces may comprise, e.g., longitudinal forces and lateral forces, as well as different types of torques. The interface between VMM and MSDs capable of delivering torque to the vehicle's wheels has, traditionally, been focused on torque based requests to each MSD from the VMM. However, significant benefits can be achieved by instead using a wheel speed or wheel slip based request—thereby shifting the difficult actuator speed control loop to the MSD controllers, which generally operate with a much shorter sample time that the VMM. Such an architecture can provide much better disturbance rejection compared to a torque based control interface and improve the predictability of the forces generated at the tire-road contact patch.

Although the wheel speed (or slip) based interface has many benefits, there are hard safety requirements relating to preventing excessive wheel slip and loss of vehicle stability which must be met by vehicles on public roads. A significant amount of testing, verification and documentation is necessary before a VMM based wheel speed or slip interface can be delivered to public roads.

It is therefore desirable to reduce the safety requirements on the VMM and MSD speed control loops by adding a safety functionality that can prevent these functions from locking wheels and/or introducing undesired yaw motion. With some small modifications to existing communication signals and special considerations in VMM relating to the allocation of speed requests, existing anti-lock braking, traction control, and stability control functionality that exists in the brake system today can be used to provide this safety net.

The VMM is, of course, designed such that the vehicle motion is kept within an operational design domain of the vehicle, i.e., such that wheel slips are kept within acceptable boundaries and optionally also such that vehicle yaw rate does not go beyond set safety levels. However, due to various reasons, the VMM function may potentially generate a control command which inadvertently results in an undesired wheel behavior. If this happens, safety measures must be in place to mitigate the consequences of this unexpected wheel behavior.

The present disclosure relates to a technique where a capability range is defined which comprises a range of acceptable wheel behaviors, e.g., in terms of wheel slip and/or wheel rotational acceleration. As long as the wheel behavior stays within the boundaries set by the capability range, the VMM is allowed to control the different MSDs. However, if the wheel behavior goes outside of the capability range, then the MSD control unit triggers one or more control intervention functions.

For excessive positive wheel slips—upon measuring a wheel slip beyond a given threshold and/or a large positive wheel rotational acceleration, the MSD control unit may impose a torque limit on the propulsion device in an attempt to allow the wheel to recover to a stable part of the tire curve (tire curves are discussed in more detail below in connection to FIG. 3).

If the slip is only occurring on one side of a driven axle, this usually indicates a split-mu situation, where available friction force is higher on one side of the road compared to the other. In this situation, the brake system may, in addition to imposing a torque limit, also provide brake torque on the spinning wheel in order to transfer driving torque through an open differential to the non-slipping wheel.

For excessive negative slip (e.g., during engine braking, or due to driveline inertia)—upon measuring a wheel slip beyond a given threshold and/or a large negative wheel rotational acceleration, the MSD control unit may impose a 'zero engine braking' torque limit on the propulsion unit. This limit can be communicated by the MSD control unit either as a torque limit signal to the propulsion unit from the brake system or by simply sending an 'anti-lock braking active' signal, in which case the propulsion unit is required to release all braking torque.

In cases where the wheel has come close to a wheel lock situation due to, e.g., downshifting gears, the MSD control unit can, in some situations, request a positive torque from the propulsion unit in order to bring the wheel slip back to a stable region of the tire curve. The above approaches for handling critical wheel behaviors by an MSD controller, such as an electronic brake system (EBS), are 'proven in use' and represent a reasonable choice when the propulsion device is very slow to respond, i.e., has a low control bandwidth. The above approach also places relatively simple safety requirements on the propulsion device (e.g., it should always release braking torque when an anti-lock braking signal becomes active), which is an advantage.

A relevant capability range may be determined, e.g., by computer simulation or by practical experimentation. Capability ranges can also, in some cases, be inherited from legacy safety systems, such as anti-lock systems and systems for traction control. This can be done, e.g., by determining when a legacy safety system would have intervened and then defining the capability range based on this operating point, perhaps with some added safety margin. Capability ranges involving wheel slips will also be discussed in more detail below in connection to FIG. 3.

Figure 2:
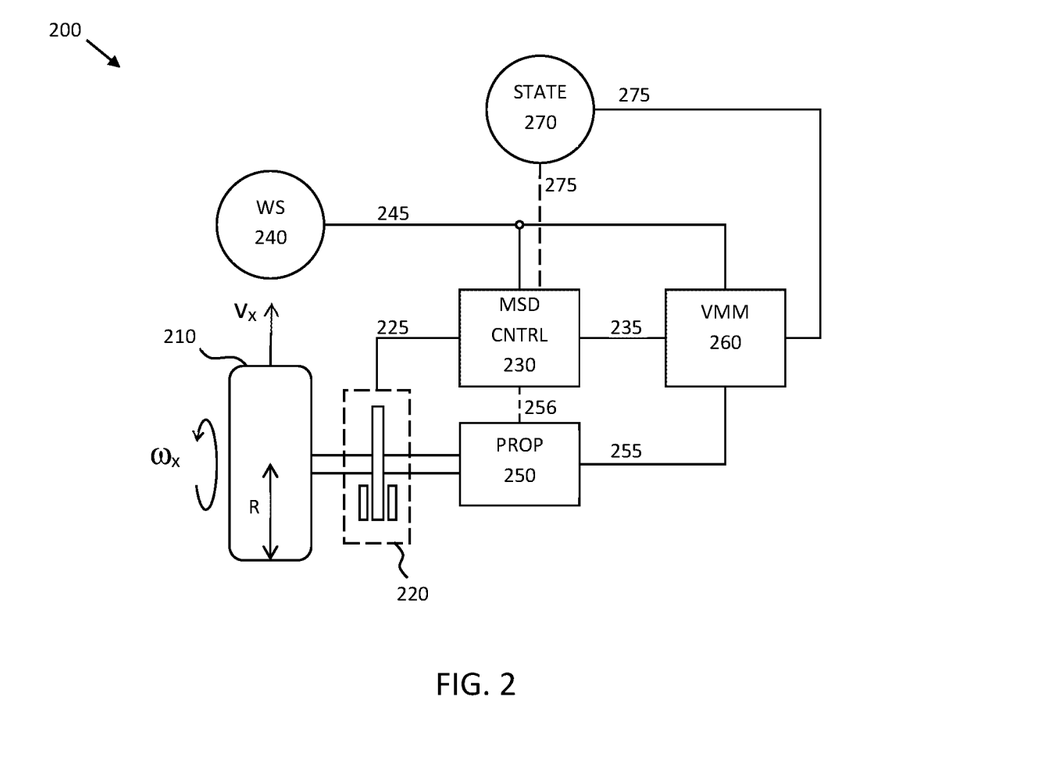
FIG. 2 schematically illustrates a motion support device arrangement.

FIG. 2 shows a wheel end section of the vehicle 100 where the proposed technique may be implemented. A wheel 210 is associated with wheel behavior, such as a current wheel slip and/or wheel acceleration. A service brake 220 is configured to generate negative torque to brake the wheel 210. For example, the service brake may be a friction brake as schematically illustrated in FIG. 2, a drum brake, or any other type of brake configured to generate negative torque, including regenerative brakes comprised in many electrical machines.

An MSD control unit 230 is communicatively coupled via an interface 235 to VMM 260 and configured to control the service brake 220 via a service brake interface 225. This control is facilitated by wheel behavior data, such as current wheel speed, received from a wheel speed sensor (WS) 240. The wheel speed data may either be received directly from the wheel speed sensor 240 via interface 245 or indirectly via VMM 260 over the interface 235.

Vehicle state information from one or more vehicle state sensors 270 is available via a vehicle state interface 275. This vehicle state information may, e.g., comprise an accurate estimate of vehicle velocity, which, if translated into the coordinate system of the wheel 210, can be used to accurately determine wheel slip, as will be discussed in more detail below. The VMM 260 is, according to the example in FIG. 2, also configured to control a propulsion device 250. This propulsion device may, e.g., be an electric machine or a combustion engine configured to drive the wheel 210, i.e., to generate a positive torque. Longitudinal wheel slip 2 may, in accordance with SAE J670 (SAE Vehicle Dynamics Standards Committee Jan. 24, 2008), be defined as $$\lambda = \frac{R\omega_x - v_x}{\max(|R\omega|, |v_x|)}$$

where R is an effective wheel radius in meters, $\omega_x$ is the angular velocity of the wheel, and $v_x$ is the longitudinal speed of the wheel (in the coordinate system of the wheel). Thus, $\lambda$ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition.

The VMM 260 and optionally also the MSD control unit 230 maintains information on $v_x$ (in the reference frame of the wheel), while a wheel speed sensor 240 or the like can be used to determine ω.

Notably, in the following, when limits on wheel slip are discussed, it is the magnitude or absolute value of the wheel slip which is limited. For example, an increased wheel slip limit may refer to either a larger positive allowed wheel slip or a smaller negative allowed wheel slip.

Figure 3:
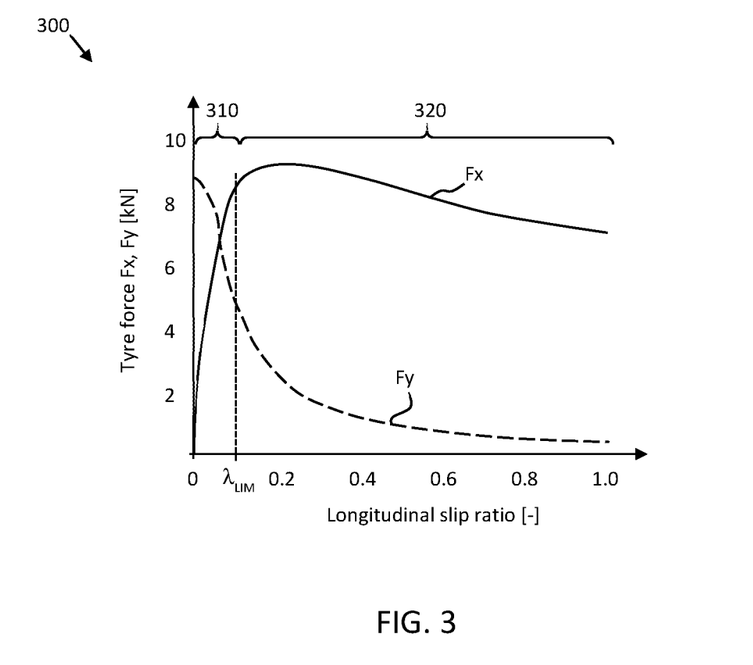
FIG. 3 is a graph showing tire force as a function of wheel slip.

FIG. 3 is a graph showing achievable tire force as a function of wheel slip. The longitudinal obtainable tire force Fx shows an almost linearly increasing part 310 for small wheel slips, followed by a part 320 with more non-linear behavior for larger wheel slips. The obtainable lateral tire force Fy decreases rapidly even at relatively small longitudinal wheel slips. It is desirable to maintain vehicle operation in the linear region 310, where the obtainable longitudinal force in response to an applied brake command is easier to predict and where enough lateral tire force can be generated if needed. To ensure operation in this region, a wheel slip limit $\lambda_{LIM}$ on the order of, e.g., 0.1, can be imposed on a given wheel. This type of tire model can be used by the VMM to generate a desired tire force at some wheel. Instead of requesting a torque corresponding to the desired tire force, the VMM can translate the desired tire force into an equivalent wheel slip and request this slip instead.

The main advantage being that the MSD control device will be able to deliver the requested torque with much higher bandwidth by maintaining operation at the desired wheel slip, using the vehicle speed $v_x$ and the wheel rotational velocity $\omega_x$.

A valid capability range could, for instance, be determined in relation to the tire force curve. As long as wheel slip is kept below 0.1, i.e., in the range between 0-0.1, force coordination and overall vehicle motion management is relatively straightforward. However, as soon as wheel slip goes beyond this range, control becomes much more difficult.

Figure 4:
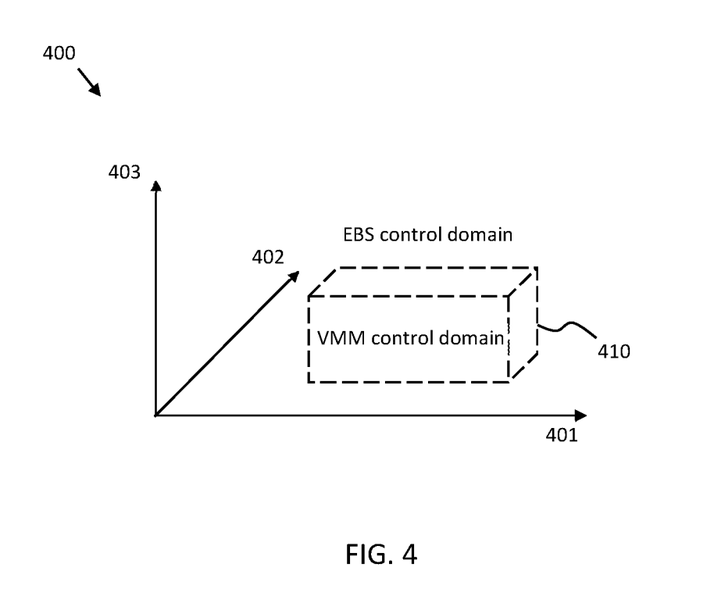
FIG. 4 schematically illustrates a capability range.

FIG. 4 schematically illustrates an example capability range 400. This particular capability range example has three dimensions 401, 402, 403. One dimension may correspond to wheel slip, another dimension may correspond to wheel acceleration, while a third dimension may correspond to vehicle yaw rate. According to the present teaching, as long as the wheel behavior is kept within the defined capability range 410, the VMM is allowed to control the MSDs by the control commands transmitted over the interfaces 235, 255 to the MSD control unit 230 and the propulsion device 250. However, if something unexpected happens which brings current wheel behavior outside of the defined capability range 410, then the MSD control unit 230 triggers a control intervention function. This control intervention function may comprise the MSD function overriding the control commands received from the VMM, or it may comprise the MSD control unit requesting vehicle control by transmitting a request to some external arbitrator function which then decides if the request for control override should be granted or not.

With reference to FIG. 2, the MSD control unit 230 is configured to control one or more MSDs 220, 250 associated with the wheel 210. The one or more MSDs may comprise at least one service brake 220 configured to generate negative torque by the wheel 210, as well as propulsion units 250 configured to generate a positive and/or a negative torque by the wheel 210, such as electric machines and/or combustion engines. The MSD control unit 230 is communicatively coupled 235 to the VMM unit 260 for receiving control commands from the VMM unit 260 comprising wheel speed and/or wheel slip requests to control vehicle motion by the one or more MSDs 220, 250.

It is appreciated that the MSD control units discussed herein may also be configured to control one or more MSDs associated with other wheels, in addition to the wheel 210, such as MSDs for controlling wheels of a given axle or the wheels on one side of a trailer unit, or all wheels of a trailer unit.

The MSD control unit 230 is configured to obtain a capability range indicating a range of wheel behaviors of the wheel 210, for which the VMM unit 260 is allowed to influence the behavior of the wheel by the control commands. This capability range is indicative of an operational regime of the vehicle and the wheel which is considered safe. According to various aspects, the capability range may comprise any of; an upper limit on allowable positive and/or negative longitudinal wheel slip, an upper limit on allowable positive and/or negative longitudinal wheel acceleration, and/or an upper limit on allowable positive and/or negative vehicle yaw rate. The capability range may either be a fixed capability range obtained as a parameter loaded from memory or received from an external configuration entity, or a dynamic capability range which is continuously updated independently of, e.g., the driving scenario and vehicle state such as vehicle load, estimated road friction, and other scenario parameters.

The allowed slip, acceleration, and yaw rate ranges may, of course, also have lower limits. Normally, the upper limit is a positive value, and the lower limit is a negative value. However, there could also be scenarios and use cases where both upper and lower limits are negative or when both upper and lower limits are positive.

The MSD control unit 230 is furthermore configured to monitor wheel behavior, e.g., by the wheel sensor 240, and to detect if wheel behavior is outside the capability range. This monitoring may comprise filtering samples of wheel behavior over time, in which case the detecting can be based on the result of the filtering.

If the monitored wheel behavior goes outside of the capability range, the MSD control unit 230 triggers a control intervention function. The control intervention function may for instance comprise executing an intervention function by one or more of the MSDs 220, 250, as discussed above. The control intervention function may also comprise triggering a request to an external arbitrator function, which may be comprised in the VMM or in some other VUC module, for direct MSD control by the MSD control unit 230.

The VMM unit 260 is communicatively coupled 235 to the MSD control unit 230 and transmits control commands comprising wheel speed and/or wheel slip requests to the MSD control unit 230 to control vehicle motion by the one or more MSDs 220, 250.

The VMM unit 260 is configured to obtain the above discussed capability range indicating a range of wheel behaviors of the wheel 210, for which the VMM unit 260 is allowed to influence the behavior of the wheel by the control commands. The VMM unit 260 is also configured to generate the control commands such that the wheel behavior is within the capability range.

According to some aspects, the VMM unit 260 comprises an arbitrator function configured to receive a request for direct MSD control by the MSD control unit 230 and to cede vehicle control to the MSD control unit 230 in case wheel behavior is outside of a pre-determined wheel behavior safety range. This arbitrator function may be configured to take other factors into account when deciding if the VMM should be allowed to control wheel behavior or if the MSD control unit should be allowed to step in and take over by executing, e.g., an anti-lock function or a traction control function. The VMM unit may also be configured to generate a request to this arbitrator function in order to temporarily control some wheel or some wheels to go beyond the current capability range. This could, for instance, be the case if an emergency maneuver is to be executed. In such a case, the arbitrator function may allow the VMM to control one or more wheels to have wheel behaviors outside of the capability range for a limited period of time.

Figure 5:
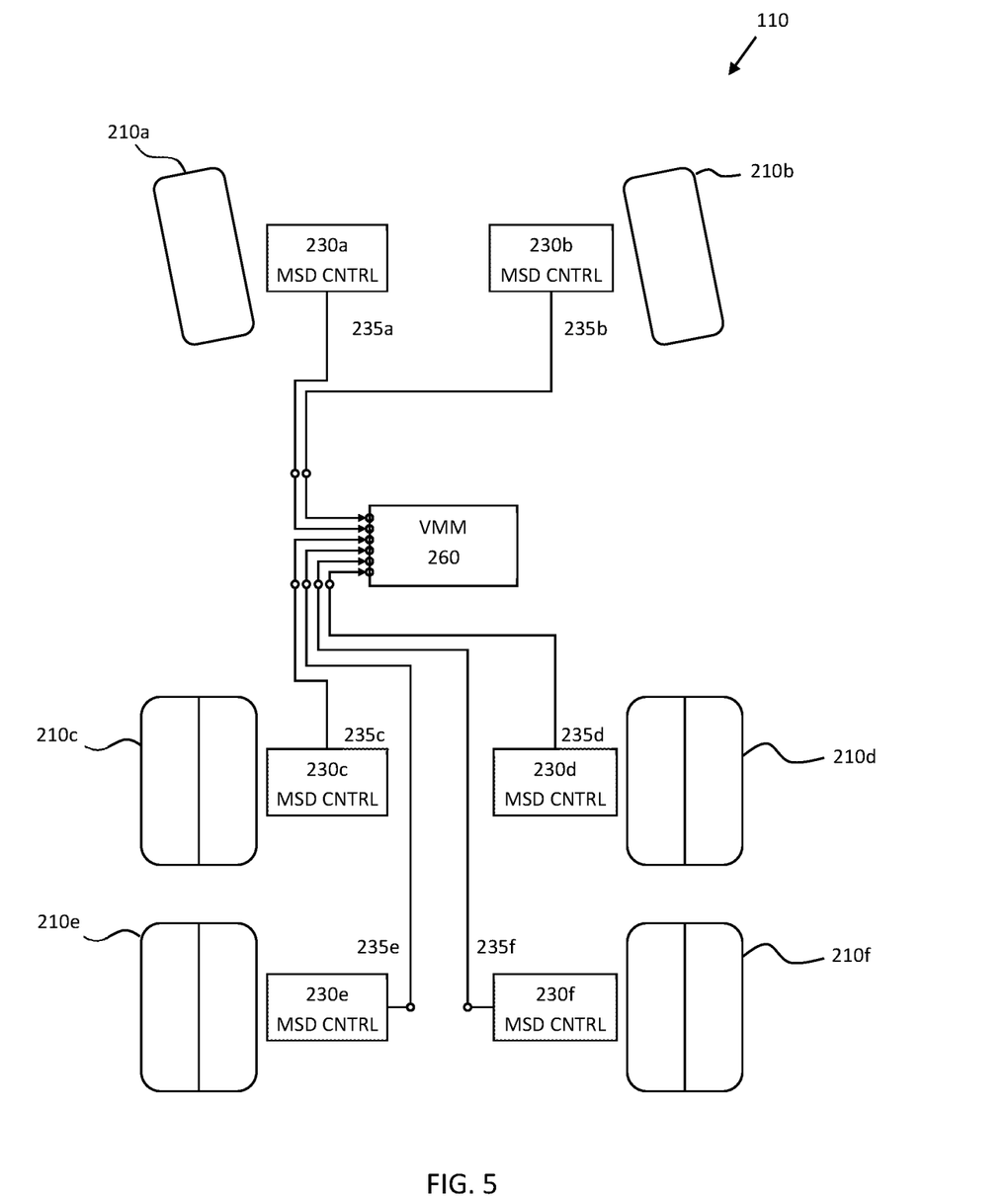
FIGS. 5-6 show example motion support device control systems.
Figure 6:
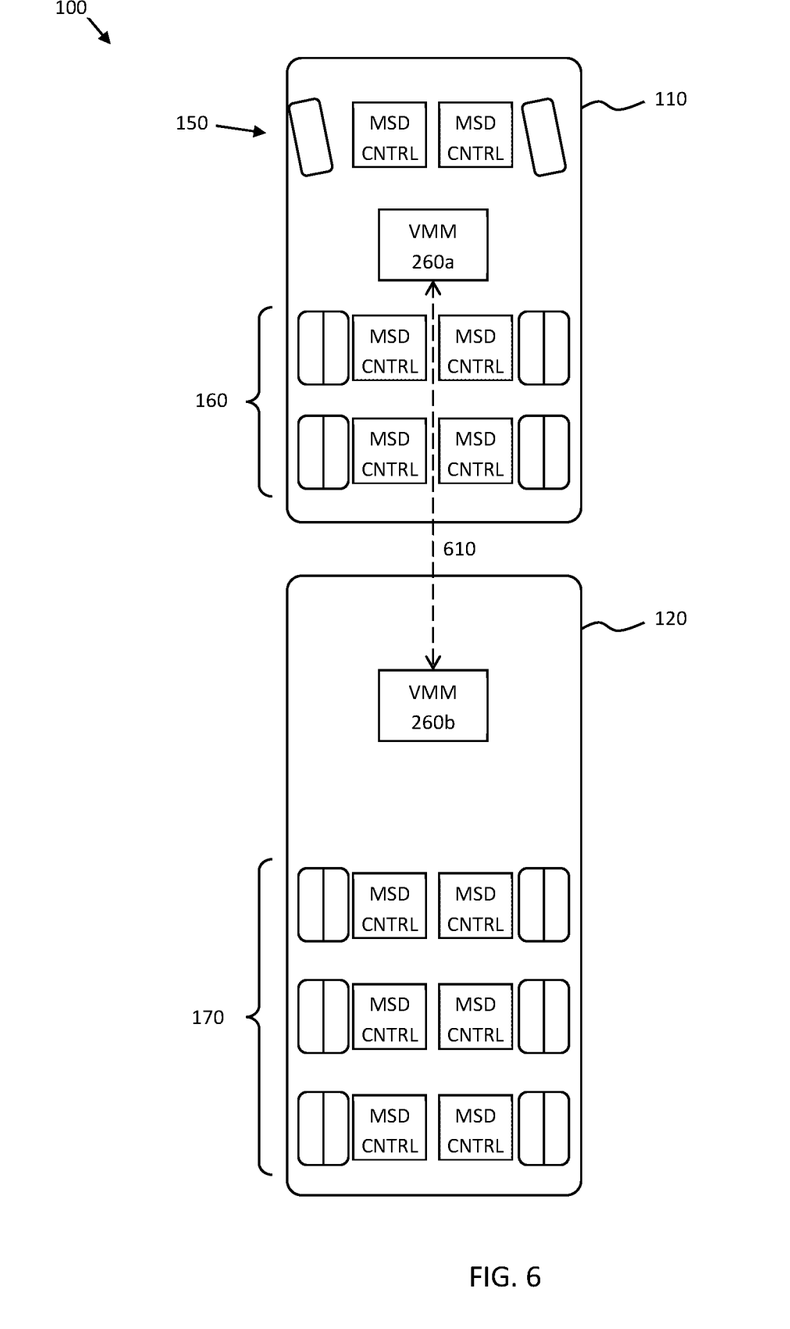
Figure 7:
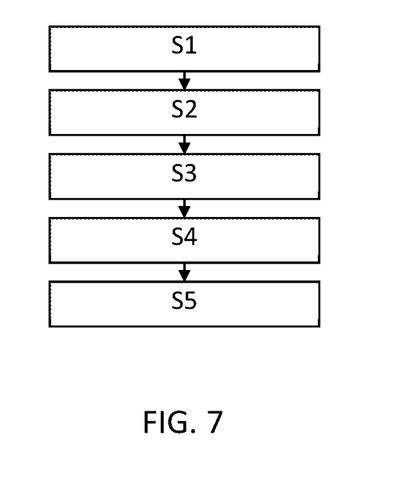
FIG. 7 is a flow chart illustrating a method.

FIG. 5 schematically illustrates a truck or towing vehicle 110 with a VMM 260 configured to control a plurality of MSD control units 230a, 230b, 230c, 230d, 230e, 230f. Each MSD control unit is configured to control a respective wheel 210a, 210b, 210c, 210d, 210e, 210f. FIG. 6 schematically illustrates a truck or towing vehicle 110 connected to a trailer vehicle 120. A first VMM unit 260a transmits control commands to MSD control units on the truck 110, while a second VMM unit 260b, operating in slave mode with respect to the first VMM unit 260a, transmits control commands to MSD control units associated with wheels on the trailer unit 120. The communication link 610 between the different VMM units 260a, 260b is preferably a wired connection, although wireless connections may also be considered. FIG. 7 is a flow chart illustrating methods which summarize at least some of the discussions above. There is illustrated a method for controlling motion by a heavy duty vehicle 100. The method comprises configuring S1 an MSD control unit 230 to control one or more MSDs 220, 250 associated with a wheel 210 on the vehicle 100 as exemplified above in connection to FIG. 2. The method also comprises configuring S2 a VMM unit 260 to perform vehicle motion management by the one or more MSDs 220, 250 via control commands transmitted to the MSD control unit 230, and defining S3 a capability range indicating a range of wheel behaviors of the wheel 210 for which the VMM unit 260 is allowed to influence the behavior of the wheel by the control commands. The method further comprises monitoring S4 wheel behavior and triggering S5 a control intervention function by the MSD control unit 230 in case the monitored wheel behavior is outside of the defined capability range, as discussed above.

Figure 8:
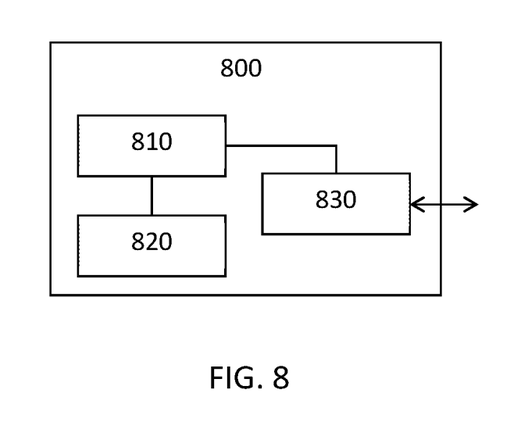
FIG. 8 schematically illustrates a control unit.

FIG. 8 schematically illustrates, in terms of a number of functional units, the components of a control unit 800 such as the VUC 130, 140, the MSD control unit 230, or the VMM unit 260, according to embodiments of the discussions herein. This control unit 800 is configured to execute at least some of the functions discussed above for control of a heavy duty vehicle 100. Processing circuitry 810 is provided using any combination of one or more of a suitable central processing unit CPU, multiprocessor, microcontroller, digital signal processor DSP, etc., capable of executing software instructions stored in a computer program product, e.g. in the form of a storage medium 820. The processing circuitry 810 may further be provided as at least one application specific integrated circuit (ASIC) or field programmable gate array (FPGA).

Particularly, the processing circuitry 810 is configured to cause the control unit 101 to perform a set of operations, or steps, such as the methods discussed in connection to FIG. 7. For example, the storage medium 820 may store the set of operations, and the processing circuitry 810 may be configured to retrieve the set of operations from the storage medium 820 to cause the control unit 800 to perform the set of operations. The set of operations may be provided as a set of executable instructions. Thus, the processing circuitry 810 is thereby configured to execute methods as herein disclosed.

The storage medium 820 may also comprise persistent storage, which, for example, can be any single one or combination of magnetic memory, optical memory, solid state memory, or even remotely mounted memory.

The control unit 800 may further comprise an interface 830 for communications with at least one external device. As such, the interface 830 may comprise one or more transmitters and receivers, comprising analog and digital components and a suitable number of ports for wireline or wireless communication.

The processing circuitry 810 controls the general operation of the control unit 800, e.g., by sending data and control signals to the interface 830 and the storage medium 820, by receiving data and reports from the interface 830, and by retrieving data and instructions from the storage medium 820. Other components, as well as the related functionality, of the control node are omitted in order not to obscure the concepts presented herein.

Figure 9:
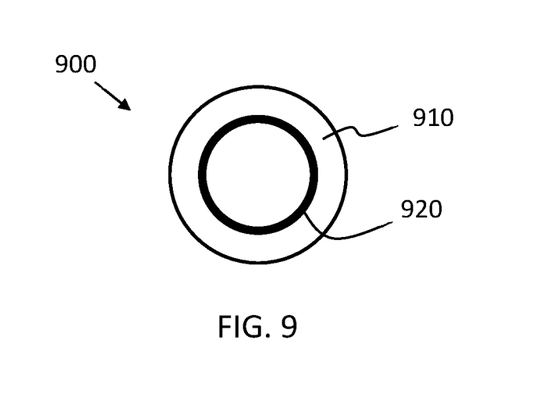
FIG. 9 shows an example computer program product.

FIG. 9 illustrates a computer readable medium 910 carrying a computer program comprising program code means 920 for performing the methods illustrated in FIG. 7, when said program product is run on a computer. The computer readable medium and the code means may together form a computer program product 900.

The invention claimed is:

1. A motion support device (MSD) control circuit for a heavy duty vehicle, configured to control one or more motion support devices (MSDs) associated with at least one wheel on the vehicle, the MSD control circuit is configured to be communicatively coupled to a vehicle motion management (VMM) circuit for receiving control commands from the VMM circuit comprising target wheel speed and/or target wheel slip requests to control vehicle motion by the one or more MSDs, wherein each target wheel speed or target wheel slip request corresponds to translation by the VMM of a desired target tire force to an equivalent target wheel slip and the target wheel slip is related to a difference between the target wheel speed and a vehicle speed, the MSD control circuit is configured to:
   obtain a capability range indicating a range of wheel behaviors of the wheel for which the VMM circuit is allowed to influence the behavior of the wheel by the control commands,
   monitor wheel behavior and detect if wheel behavior is outside of the capability range, and
   trigger a control intervention function if the monitored wheel behavior is outside of the capability range.

2. The MSD control circuit of claim 1, wherein the one or more MSDs comprise at least one service brake configured to generate negative torque by the wheel.

3. The MSD control circuit of claim 1, wherein the one or more MSDs comprise at least one propulsion unit configured to generate a positive and/or a negative torque by the wheel.

4. The MSD control circuit of claim 1, wherein the capability range comprises an upper limit on allowable positive and/or negative longitudinal wheel slip and/or wheel rotational speed.

5. The MSD control circuit of claim 1, wherein the capability range comprises an upper limit on allowable positive and/or negative longitudinal wheel acceleration.

6. The MSD control circuit of claim 1, wherein the capability range comprises an upper limit on allowable positive and/or negative vehicle yaw rate.

7. The MSD control circuit of claim 1, wherein the capability range comprises a lower limit on allowable positive and/or negative longitudinal wheel slip and/or wheel rotational speed.

8. The MSD control circuit of claim 1, wherein the capability range comprises a lower limit on allowable positive and/or negative longitudinal wheel acceleration.

9. The MSD control circuit of claim 1, wherein the capability range comprises a lower limit on allowable positive and/or negative vehicle yaw rate.

10. The MSD control circuit of claim 1, wherein the MSD control circuit is configured to receive wheel speed data associated with the wheel from a wheel speed sensor and to detect if wheel behavior is outside the capability range based on the wheel speed data.

11. The MSD control circuit of claim 1, wherein the MSD control circuit is configured to obtain a fixed capability range as a parameter loaded from memory or received from an external configuration entity.

12. The MSD control circuit of claim 1, wherein the MSD control circuit is configured to continuously obtain an updated capability range.

13. The MSD control circuit of claim 1, wherein the control intervention function comprises executing an intervention function by one or more of the MSDs.

14. The MSD control circuit of claim 1, wherein the control intervention function comprises triggering a request to an external arbitrator function for direct MSD control by the MSD control circuit.

15. The MSD control circuit of claim 1, wherein the MSD control circuit is configured to monitor wheel behavior by filtering samples of wheel behavior over time and to detect if wheel behavior is outside of the capability range based on a result of the filtering.

16. A vehicle motion management (VMM) circuit configured to perform vehicle motion management for controlling motion of a heavy duty vehicle by one or more motion support devices (MSDs) associated with at least one wheel on the vehicle, the VMM circuit is configured to be communicatively coupled to an MSD control circuit for transmitting control commands comprising target wheel speed and/or target wheel slip requests to the MSD control circuit to control vehicle motion by the one or more MSDs, wherein each target wheel speed or target wheel slip request corresponds to translation by the VMM of a desired target tire force to an equivalent target wheel slip and the target wheel slip is related to a difference between the target wheel speed and a vehicle speed, the VMM circuit is configured to:

obtain a capability range indicating a range of wheel behaviors of the wheel for which the VMM circuit is allowed to influence the behavior of the wheel by the control commands, and generate the control commands such that the wheel behavior is within the capability range.

17. The VMM circuit of claim 16, comprising an arbitrator function configured to receive a request for direct MSD control by the MSD control circuit and to cede vehicle control to the MSD control circuit if wheel behavior is outside of a pre-determined wheel behavior safety range.

18. A method for controlling motion by a heavy duty vehicle, the method comprising:

configuring a motion support device (MSD) control circuit to control one or more motion support devices (MSDs) associated with at least one wheel on the vehicle, configuring a vehicle motion management (VMM) circuit to perform vehicle motion management by the one or more MSDs via control commands transmitted to the MSD control circuit, defining a capability range indicating a range of wheel behaviors of the wheel for which the VMM circuit is allowed to influence the behavior of the wheel by the control commands, monitoring wheel behavior, and triggering a control intervention function by the MSD control circuit responsive to the MSD control circuit detecting that the monitored wheel behavior is outside of the defined capability range;

wherein:

the control commands from the VMM circuit comprise target wheel speed and/or target wheel slip requests to control vehicle motion by the one or more MSDs; and each target wheel speed or target wheel slip request corresponds to translation by the VMM of a desired target tire force to an equivalent target wheel slip and the target wheel slip is related to a difference between the target wheel speed and a vehicle speed.

* * * * *